United States Patent
Ramos et al.

(10) Patent No.: US 11,032,435 B1
(45) Date of Patent: Jun. 8, 2021

(54) SUPERPOSITION DETECTION AND CORRECTION

(71) Applicant: INTERNATIONAL BUSINESS MACHINES CORPORATION, Armonk, NY (US)

(72) Inventors: Igor S. Ramos, Round Rock, TX (US); Andrew J. Lavery, Austin, TX (US); Faheem Altaf, Pflugerville, TX (US); Paul Hake, Madison, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/744,611

(22) Filed: Jan. 16, 2020

(51) Int. Cl.
| | | |
|---|---|---|
| *G06K 9/03* | (2006.01) | |
| *H04N 1/00* | (2006.01) | |
| *G06F 16/23* | (2019.01) | |
| *G06K 9/46* | (2006.01) | |

(52) U.S. Cl.
CPC ..... *H04N 1/00079* (2013.01); *G06F 16/2379* (2019.01); *G06K 9/46* (2013.01); *H04N 1/00005* (2013.01); *H04N 1/00018* (2013.01); *H04N 1/00034* (2013.01); *H04N 1/00039* (2013.01); *H04N 1/00084* (2013.01); *G06K 2209/27* (2013.01)

(58) Field of Classification Search
CPC .......... H04N 1/00034; H04N 1/00039; H04N 1/00748; G06K 9/46; G06K 2209/27
USPC ............. 358/3.26, 1.12, 1.18, 504, 462, 463
See application file for complete search history.

(56) References Cited

U.S. PATENT DOCUMENTS

| | | | |
|---|---|---|---|
| 8,564,856 B2 | 10/2013 | Martin | |
| 2005/0238205 A1* | 10/2005 | Kimura | G06K 9/03 |
| | | | 382/112 |
| 2011/0081051 A1* | 4/2011 | Tayal | H04N 1/00082 |
| | | | 382/112 |
| 2016/0227181 A1 | 8/2016 | Ilic et al. | |

OTHER PUBLICATIONS

Mell et al., "The NIST Definition of Cloud Computing", Recommendations of the National Institute of Standards and Technology, NIST Special Publication 800-145, Sep. 2011, 7 pages.
Bedros, "Lecture 9: Hough Transform and Thresholding" ME5286, May 10, 2017, 73 pages, http://me.umn.edu/courses/me5286/vision/Notes/2015/ME5286-Lecture9.pdf.

\* cited by examiner

*Primary Examiner* — Jamares Q Washington
(74) *Attorney, Agent, or Firm* — Kenneth Han

(57) ABSTRACT

A method, computer system, and computer program product for document superposition detection and correction are provided. The embodiment may include receiving a plurality of scanned documents. The embodiment may also include analyzing the plurality of the scanned documents. The embodiment may further include determining if there is a superposition scanning defect within the scanned documents based on the analysis. The embodiment may also include in response to the plurality of the scanned documents containing the superposition scanning defect, identifying a subset of documents within the plurality of scanned documents containing the determined superposition scanning defect. The embodiment may further include transmitting a notification to a user, wherein the notification identifies the subset and that the subset requires a rescan.

20 Claims, 6 Drawing Sheets

SUPERPOSITION DETECTION AND CORRECTION

BACKGROUND

The present invention relates, generally, to the field of computing, and more particularly to document imaging systems.

Document imaging system relates to systems capable of replicating documents commonly used in business. Document imaging systems can take many forms including microfilm, on-demand printers, facsimile machines, copiers, multifunction printers, document scanners, computer output microfilm, and archive writers. The main method of capturing images is by scanning paper documents. Document imaging systems can replace large paper-intensive operations. Documents can be shared by all users on a network and document routing can be controlled by the computer. Document images are stored as bitmapped graphics, and although a small amount of text (keywords) may be associated with the document in order to index it.

SUMMARY

According to one embodiment, a method, computer system, and computer program product for generating a collaborative platform for document superposition detection and correction are provided. The embodiment may include receiving a plurality of scanned documents. The embodiment may also include analyzing the plurality of the scanned documents. The embodiment may further include determining if there is a superposition scanning defect within the scanned documents based on the analysis. The embodiment may also include in response to the plurality of the scanned documents containing the superposition scanning defect, identifying a subset of documents within the plurality of scanned documents containing the determined superposition scanning defect. The embodiment may further include transmitting a notification to a user, wherein the notification identifies the subset and that the subset requires a rescan.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
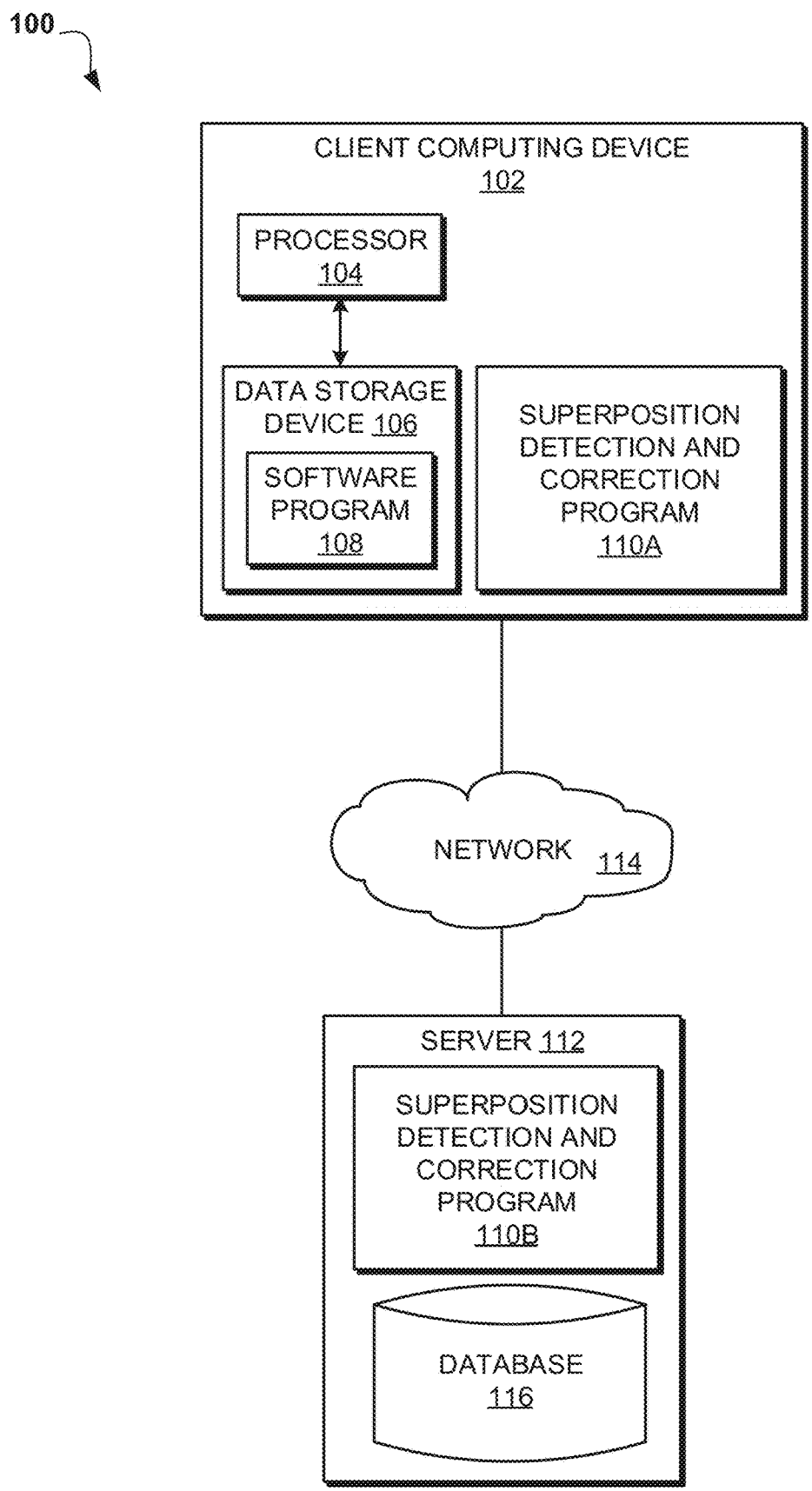
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to document imaging systems. The following described exemplary embodiments provide a system, method, and program product to analyze scanned documents to determine if there has been a document scanning defect and estimate the number of documents contained in the detected superposition. Therefore, the present embodiment has the capacity to improve the technical field of document imaging systems by indicating any sub-documents requiring a rescan to a user, such that the user can then rout the documents requiring a rescan to the original document producer for a rescan.

As previously described, a document imaging system relates to systems capable of replicating documents commonly used in business. Document imaging systems can take many forms including microfilm, on-demand printers, facsimile machines, copiers, multifunction printers, document scanners, computer output microfilm, and archive writers. The main method of capturing images is by scanning paper documents. Document imaging systems can replace large paper-intensive operations. Documents can be shared by all users on a network and document routing can be controlled by the computer. Document images are stored as bitmapped graphics, and although a small amount of text (keywords) may be associated with the document in order to index it.

For example, medical documents are frequently faxed or scanned and digitally transmitted from one medical provider to another, or from a provider to an insurance company. The image files do not contain the machine-readable text and they are instead in the form of a jpeg or other image format. Optical Character Recognition (OCR) technology is able to take an image scan and convert it back to text. However, typical OCR technology may not overcome erroneous scans when, for instance, there is one document scanned with another on top of the first document. Many times, these types of defective scans are caused by human error. Individuals may not notice such issue at the time of scanning and distribute the scanned documents for further processing. If these defects are not detected at some point in the document's processing cycle, such defects may cause negative effects on entire business practice. For example, an important medical diagnosis may be documented on part of a scan that may have been obscured, and if the scan error is not properly corrected at an appropriate time, the diagnosis may be ignored by a later medical note review, thereby resulting in suboptimal patient care. As such, it may be advantageous to, among other things, implement a system capable of notifying users of any defective scans immediately, so that the person or machine performing the scan may correct the defect as soon as the scan is made while the source document is still available or notifying an analyst of the defects, so that the analyst may route it back to the original document producer for a rescan. In the latter case, the document metadata and associated record may be used to assist the routing back to the original source.

According to one embodiment, the present invention may open image and metadata for the processing of scanned documents and perform document overlay detection. In at least one other embodiment, the present invention may also perform other types of defects related to a general scanning process. The present invention may further analyze and determine the number of documents contained in a superposition occurrence.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for determining which documents require a re-scan based on an analysis of scanned documents for any superposition or other defects and notifying a user of the documents requiring a re-scan.

Referring to FIG. 1, an exemplary networked computer environment 100 is depicted according to at least one embodiment. The networked computer environment 100 may include a client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a superposition detection and correction program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a superposition detection and correction program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the superposition detection and correction program 110A, 110B may be a program capable of determining which document requires a re-scan and which document does not require a rescan when there are multiple documents superimposed on one another as a result of the defective scanning process. The superposition detection and correction process are explained in further detail below with respect to FIG. 2.

Figure 2:
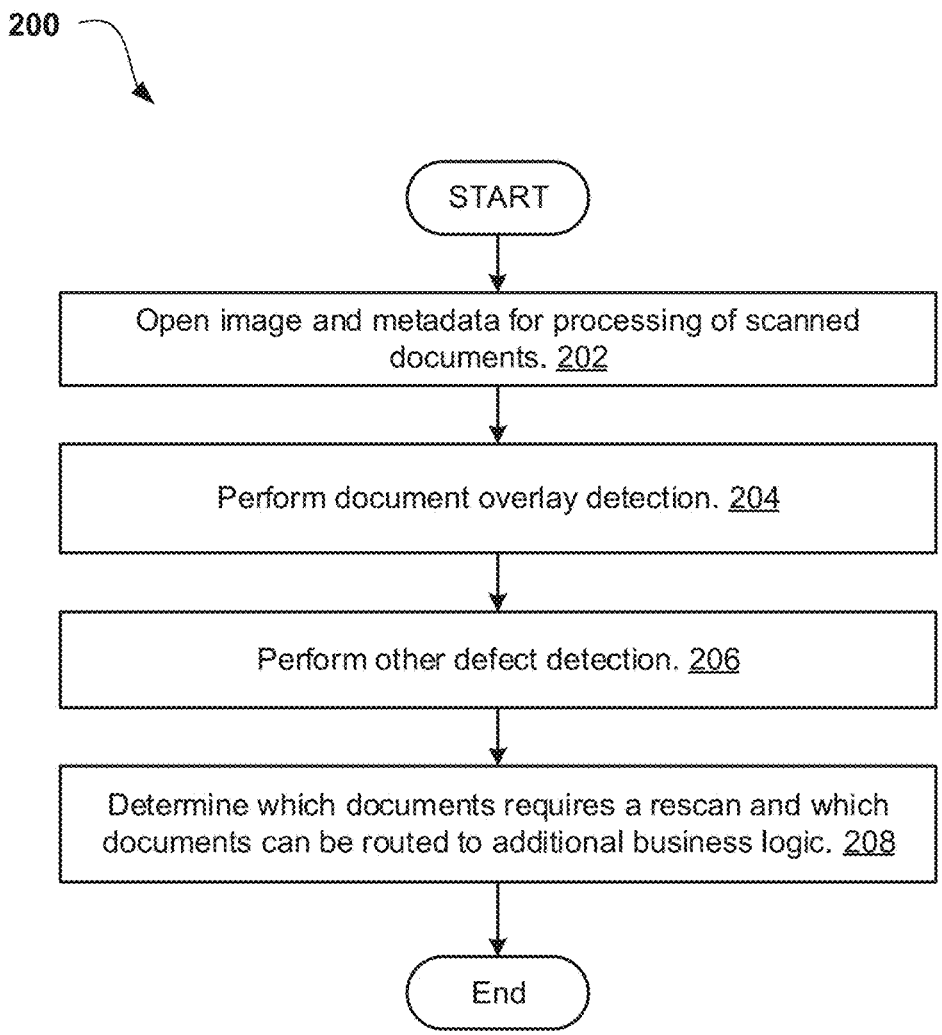
FIG. 2 is an operational flowchart illustrating a superposition detection and correction process according to at least one embodiment.

Referring to FIG. 2, an operational flowchart illustrating a superposition detection and correction process 200 is depicted according to at least one embodiment. At 202, the superposition detection and correction program 110A, 110B opens a document image and metadata for the processing of scanned documents. According to one embodiment, the superposition detection and correction program 110A, 110B may receive scanned documents from an inbound document queue and open image files of one or more scanned documents to process defect detection in later steps. In at least one other embodiment, the superposition detection and correction program 110A, 110B may identify a keyword contained in a scanned document to store in a database as metadata. Metadata may include data related to original producer of the document, the date of the original production, and the location information of the original producer, etc.

At 204, the superposition detection and correction program 110A, 110B performs document overlay detection. According to one embodiment, the superposition detection and correction program 110A, 110B may detect a number of documents in a single image page. For example, if a user scanned six pages of documents and as a result of a scan error involving superposition, the scan image file only consists of two pages, the superposition detection and correction program 110A, 110B may analyze the superposition error and determine that there were six pages of documents instead of two pages. In at least one other embodiment, the superposition detection and correction program 110A, 110B may utilize an algorithm to detect superimposition issues. One example of such an algorithm may be the Hough transform technique which implements a feature extraction technique to perform image analysis. Using the algorithm, the superposition detection and correction program 110A, 110B may find imperfect instances of an object within a certain class of shapes by a voting procedure, which in turn is carried out in a parametric form. A voting procedure may be used determine the correct parameters.

At 206, the superposition detection and correction program 110A, 110B perform other defect detection. According to one embodiment, the superposition detection and correction program 110A, 110B may analyze the superimposed documents and determine the scan quality of the document which may not need to be rescanned. In the above example, the page of the document placed on the very top of the superimposed document set may be determined to be usable and not requiring a rescan. The superposition detection and correction program 110A, 110B may then proceed to perform quality estimation of the top page. The superposition detection and correction program 110A, 110B may analyze the measure of data completeness or resolution, etc. The superposition detection and correction program 110A, 110B may determine that other pages need to be rescanned and routed to an appropriate queue.

At 208, the superposition detection and correction program 110A, 110B determines which documents require a rescan and which documents need to be routed to additional business logic. According to one embodiment, the superposition detection and correction program 110A, 110B may determine that a number of documents need to be rescanned and notify a user of such information. For example, once the superposition detection and correction program 110A, 110B determines that pages 1-4 need to be rescanned, the superposition detection and correction program 110A, 110B may notify a user that pages 1-4 require a rescan. In another embodiment, the superposition detection and correction program 110A, 110B may send the information to the server 112 to pull the metadata associated with the defective documents and send a rescan request to the original producer that may be located remotely (e.g. satellite office, out of state, etc.). With respect to the documents that do not need a rescan, the superposition detection and correction program 110A, 110B sends the data to an outbound document queue and notifies a user to perform additional procession or business logic. Since these documents do not need a rescan, the superposition detection and correction program 110A, 110B may utilize a place holder between the missing pages until rescanned documents pass the defect detection analysis and get routed to the same outbound document queue.

Figure 3:
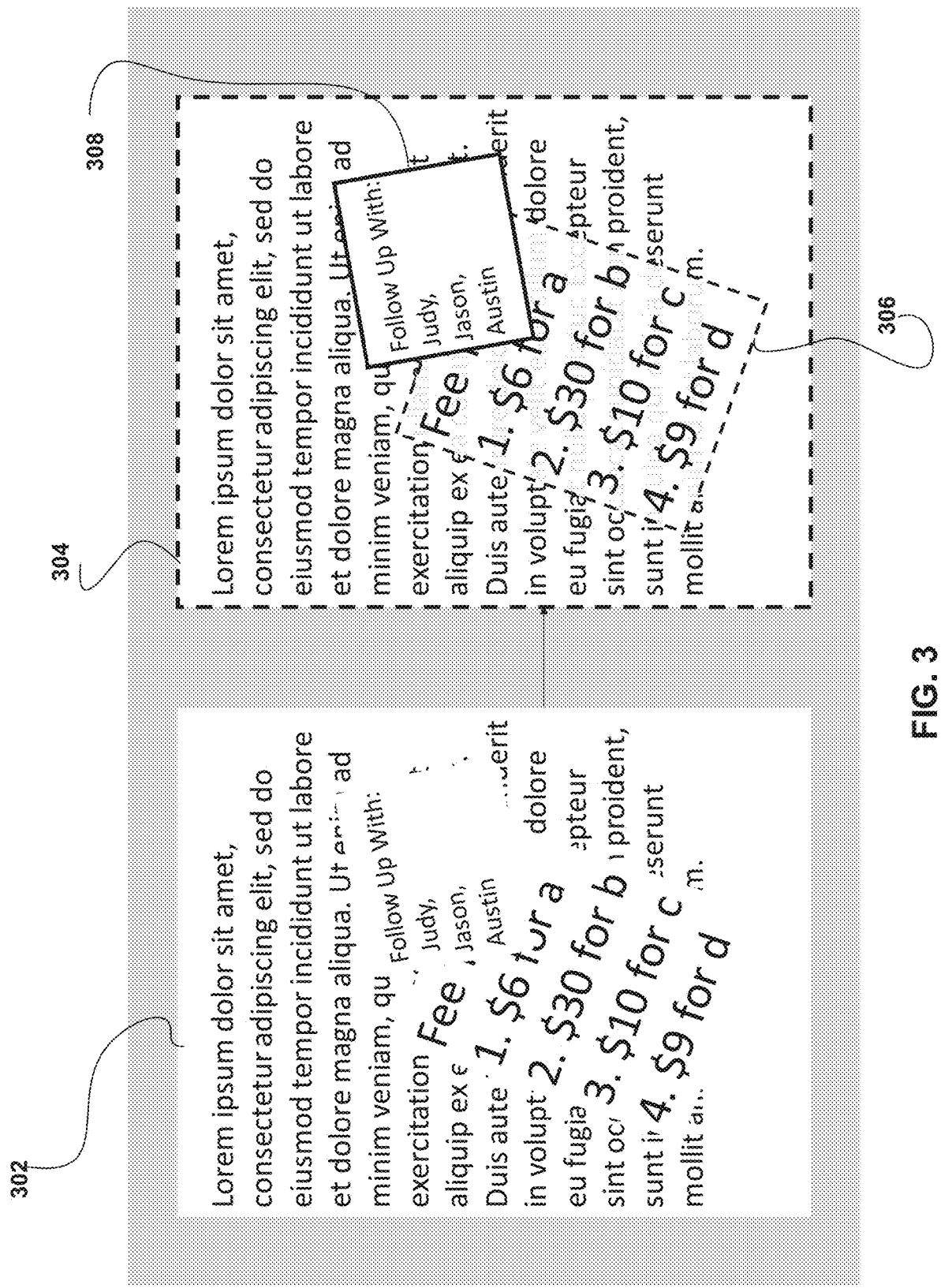
FIG. 3 is an exemplary diagram depicting a superposition detection and correction process according to at least one embodiment.

Referring now to FIG. 3, an exemplary diagram depicting a superposition detection and correction process is depicted according to at least one embodiment. According to one embodiment, the superposition detection and correction program 110A, 110B may receive a scanned document 302 and perform a defect detection analysis as described above. Once the analysis is complete, the superposition detection and correction program 110A, 110B may identify three sets of documents, the document A 304, document B 306 and document C 308. As the document A 304 and the document B 306 contain portions that are obstructed by other overlaid document, the superposition detection and correction program 110A, 110B may determine that the document A 304 and the document B 306 require a rescan. However, with respect to the document C 308, all the texts and the borders of the documents are not obscured by other pages, the superposition detection and correction program 110A, 110B may keep the document C 308 as a separate document ignoring the other documents, text, images that are outside the solid borderline drawn around the document C 308 may be cut off or disregarded as opposed to a traditional OCR technique that would indicate that all of the three documents need to be rescanned.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the superposition detection and correction program 110A, 110B may utilize other known object orientation detection techniques to detect any document superposition issues.

Figure 4:
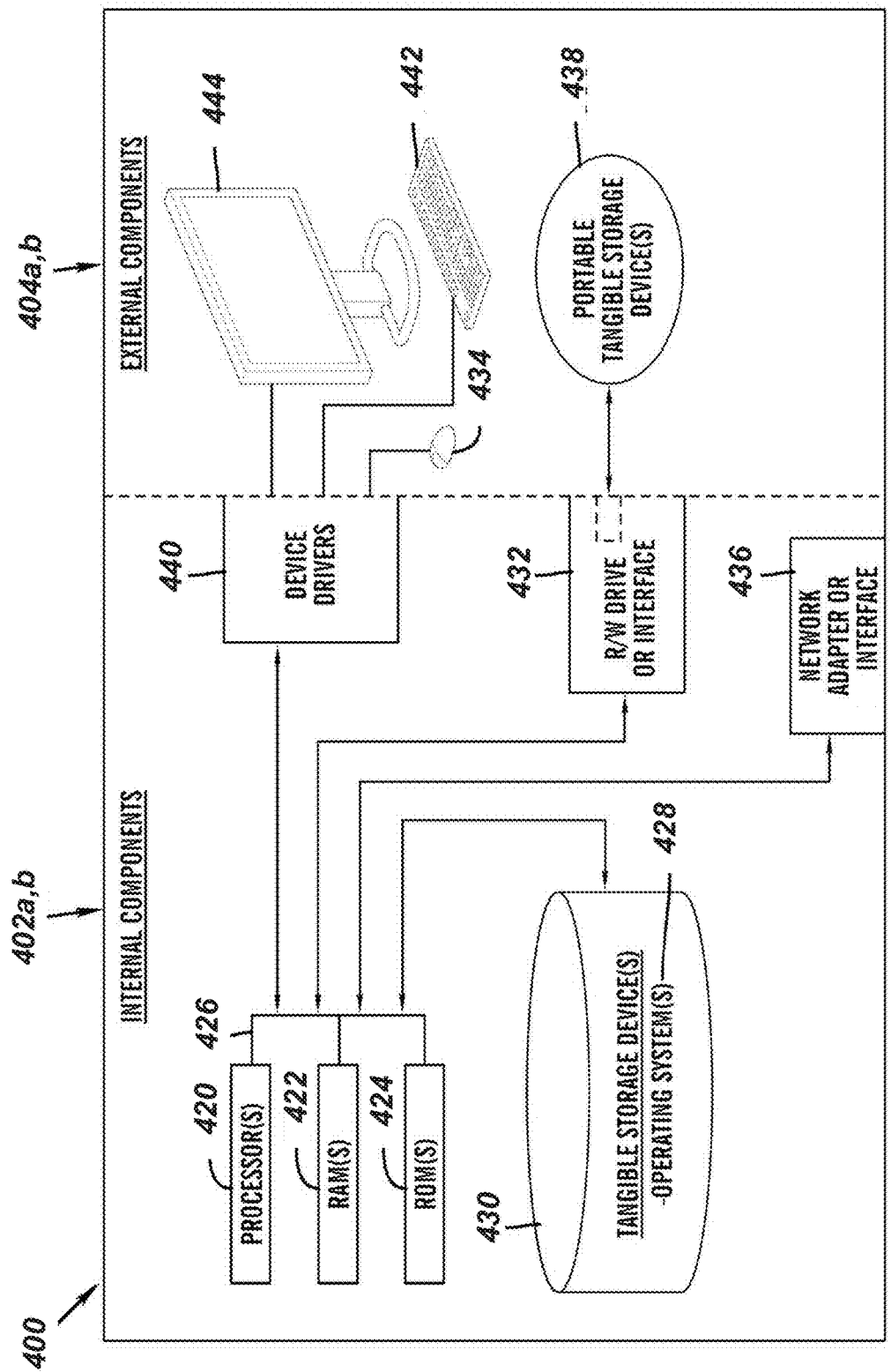
FIG. 4 is a block diagram of internal and external components of computers and servers depicted in FIG. 1 according to at least one embodiment.

FIG. 4 is a block diagram of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the NLP workspace collaboration program 110A in the client computing device 102 and the NLP workspace collaboration program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the NLP workspace collaboration program 110A, 110B can be stored on one or more of the respective portable computer-readable tangible storage devices 438, read via the respective R/W drive or interface 432 and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The software program 108 and the NLP workspace collaboration program 110A in the client computing device 102 and the NLP workspace collaboration program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the NLP workspace collaboration program 110A in the client computing device 102 and the NLP workspace collaboration program 110B in the server 112 are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
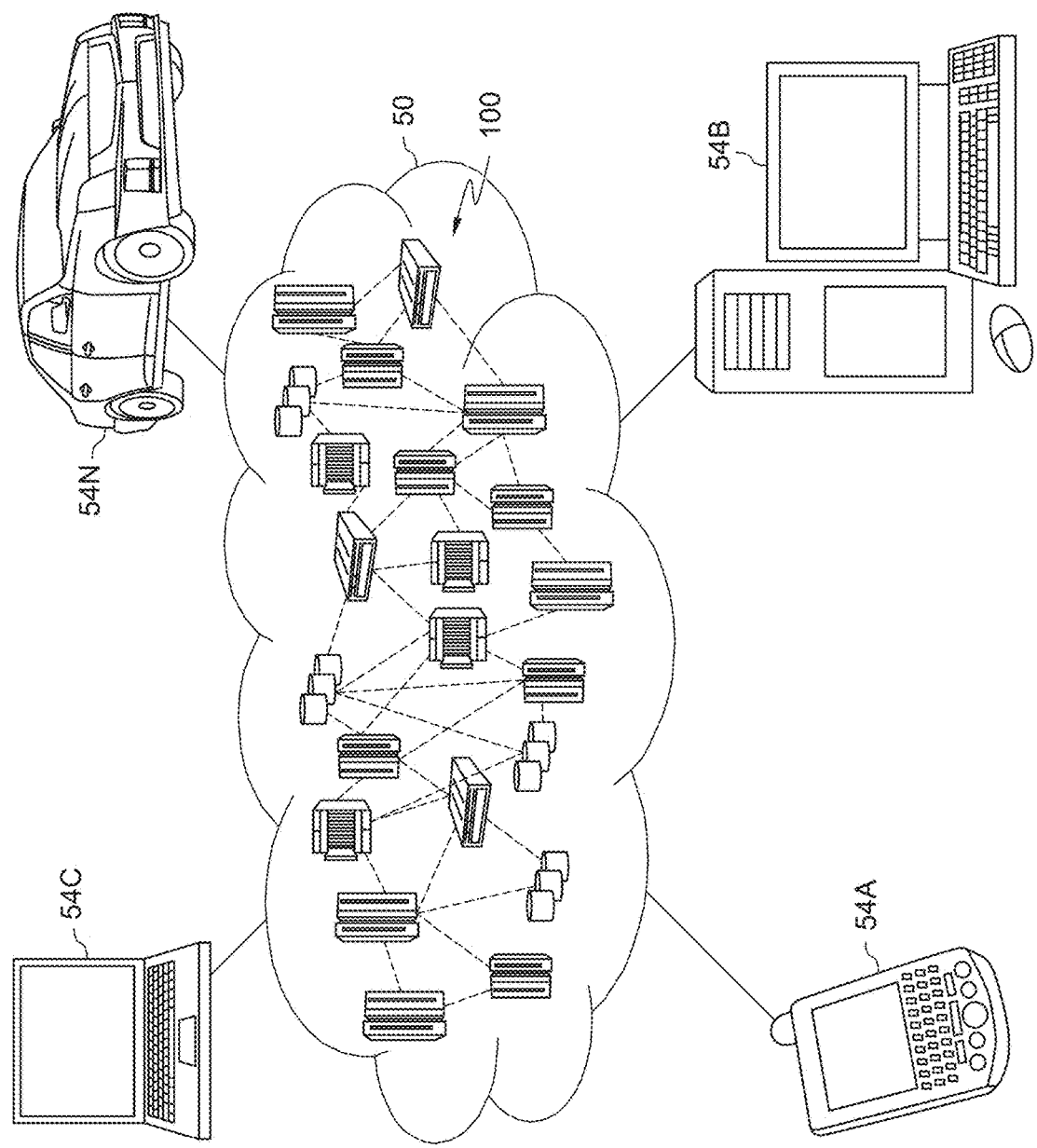
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
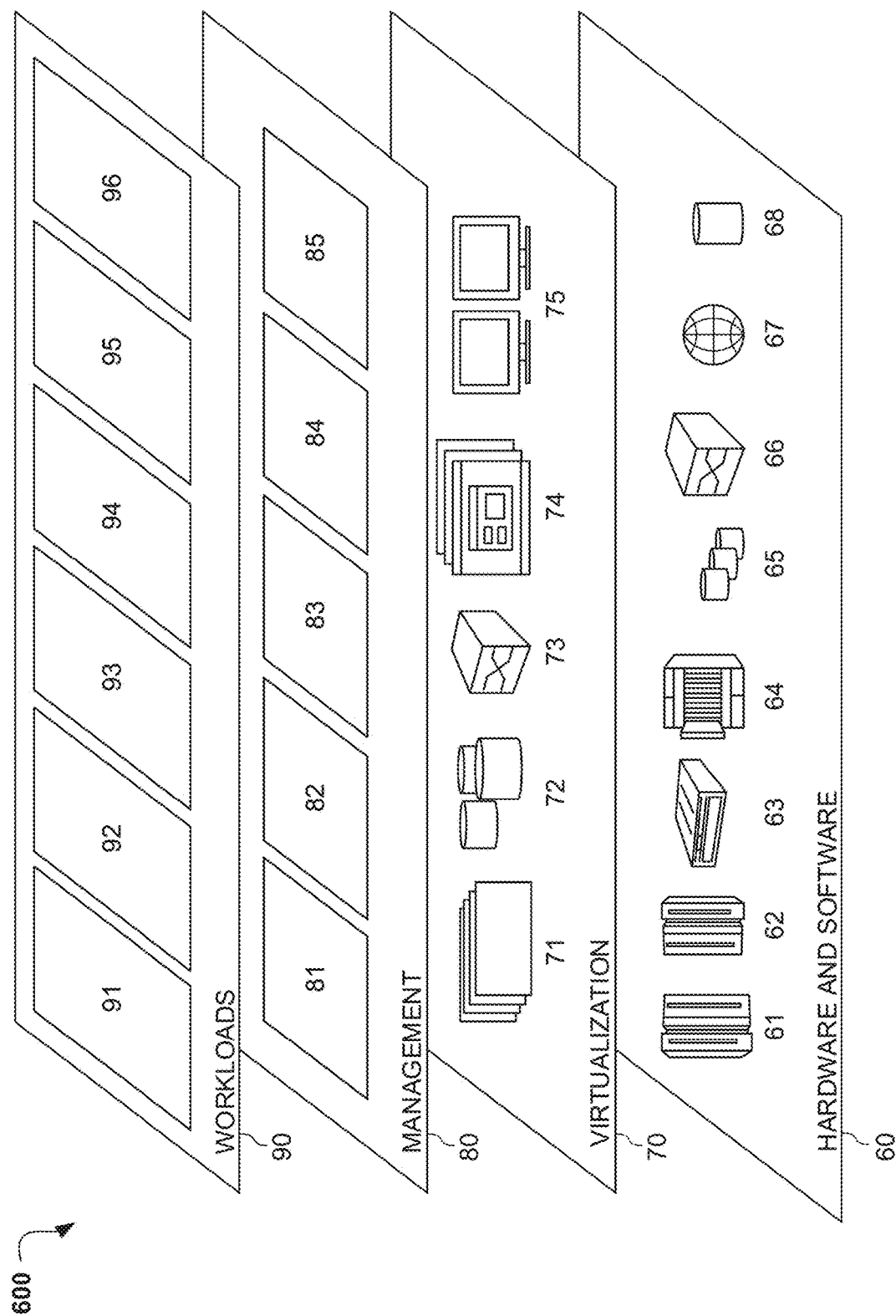
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and NLP workspace collaboration 96. NLP workspace collaboration 96 may relate to creating a collaborative platform for collective natural language querying (NLQ) based database retrieval.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for document superposition detection and correction, the method comprising:
   receiving a plurality of scanned documents;
   analyzing the plurality of the scanned documents;
   determining if there is a superposition scanning defect within the scanned documents based on the analysis;
   in response to the plurality of the scanned documents containing the superposition scanning defect, identifying a subset of documents within the plurality of scanned documents containing the determined superposition scanning defect, wherein a subset of the documents that have all texts and borders of the document that are not obscured by other documents within the plurality of scanned documents containing the determined superposition scanning defect is separated and kept as intact documents, wherein the subset of the documents that do not have their texts and borders obscured by the other documents have smaller areas than areas of the documents that have the scanning defect; and
   transmitting a notification to a user, wherein the notification identifies the subset and that the subset requires a rescan.

2. The method of claim 1, further comprising:
   identifying keywords contained in the plurality of scanned documents to store in a database as metadata.

3. The method of claim 1, further comprising:
   determining if there are other types of scanning defects in the subset that do not require the rescan.

4. The method of claim 1, further comprising:
   detecting a number of documents that are in a single image page.

5. The method of claim 4, further comprising:
   measuring data completeness of one or more documents that are contained in the single image page.

6. The method of claim 4, further comprising:
   detecting one or more edges contained in the single image page.

7. The method of claim 4, further comprising:
   identifying one or more overlaying or obscured pages within the single image page utilizing a feature extraction technique.

8. A computer system for document superposition detection and correction, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   receiving a plurality of scanned documents;
   analyzing the plurality of the scanned documents;
   determining if there is a superposition scanning defect within the scanned documents based on the analysis;
   in response to the plurality of the scanned documents containing the superposition scanning defect, identifying a subset of documents within the plurality of scanned documents containing the determined superposition scanning defect, wherein a subset of the documents that have all texts and borders of the document that are not obscured by other documents within the plurality of scanned documents containing the determined superposition scanning defect is separated and kept as intact documents, wherein the subset of the documents that do not have their texts and borders obscured by the other documents have smaller areas than areas of the documents that have the scanning defect; and
   transmitting a notification to a user, wherein the notification identifies the subset and that the subset requires a rescan.

9. The computer system of claim 8, further comprising:
   identifying keywords contained in the plurality of scanned documents to store in a database as metadata.

10. The computer system of claim 8, further comprising:
    determining if there are other types of scanning defects in the subset that do not require the rescan.

11. The computer system of claim 8, further comprising:
   detecting a number of documents that are in a single image page.

12. The computer system of claim 11, further comprising:
   measuring data completeness of one or more documents that are contained in the single image page.

13. The computer system of claim 11, further comprising:
   detecting one or more edges contained in the single image page.

14. The computer system of claim 11, further comprising:
   identifying one or more overlaying or obscured pages within the single image page utilizing a feature extraction technique.

15. A computer program product for document superposition detection and correction, the computer program product comprising:
   one or more computer-readable tangible storage media and program instructions stored on at least one of the one or more tangible storage media, the program instructions executable by a processor of a computer to perform a method, the method comprising:
      receiving a plurality of scanned documents;
      analyzing the plurality of the scanned documents;
      determining if there is a superposition scanning defect within the scanned documents based on the analysis;
      in response to the plurality of the scanned documents containing the superposition scanning defect, identifying a subset of documents within the plurality of scanned documents containing the determined superposition scanning defect, wherein a subset of the documents that have all texts and borders of the document that are not obscured by other documents within the plurality of scanned documents containing the determined superposition scanning defect is separated and kept as intact documents, wherein the subset of the documents that do not have their texts and borders obscured by the other documents have smaller areas than areas of the documents that have the scanning defect; and
      transmitting a notification to a user, wherein the notification identifies the subset and that the subset requires a rescan.

16. The computer program product of claim 15, further comprising:
   identifying keywords contained in the plurality of scanned documents to store in a database as metadata.

17. The computer program product of claim 15, further comprising:
   determining if there are other types of scanning defects in the subset that do not require the rescan.

18. The computer program product of claim 15, further comprising:
   detecting a number of documents that are in a single image page.

19. The computer program product of claim 18, further comprising:
   measuring data completeness of one or more documents that are contained in the single image page.

20. The computer program product of claim 18, further comprising:
   identifying one or more overlaying or obscured pages within the single image page utilizing a feature extraction technique.

* * * * *